E. W. GRAVES.
APPARATUS FOR TAPPING RUBBER TREES.
APPLICATION FILED NOV. 1, 1907.
1,068,497.
Patented July 29, 1913.
3 SHEETS—SHEET 1.
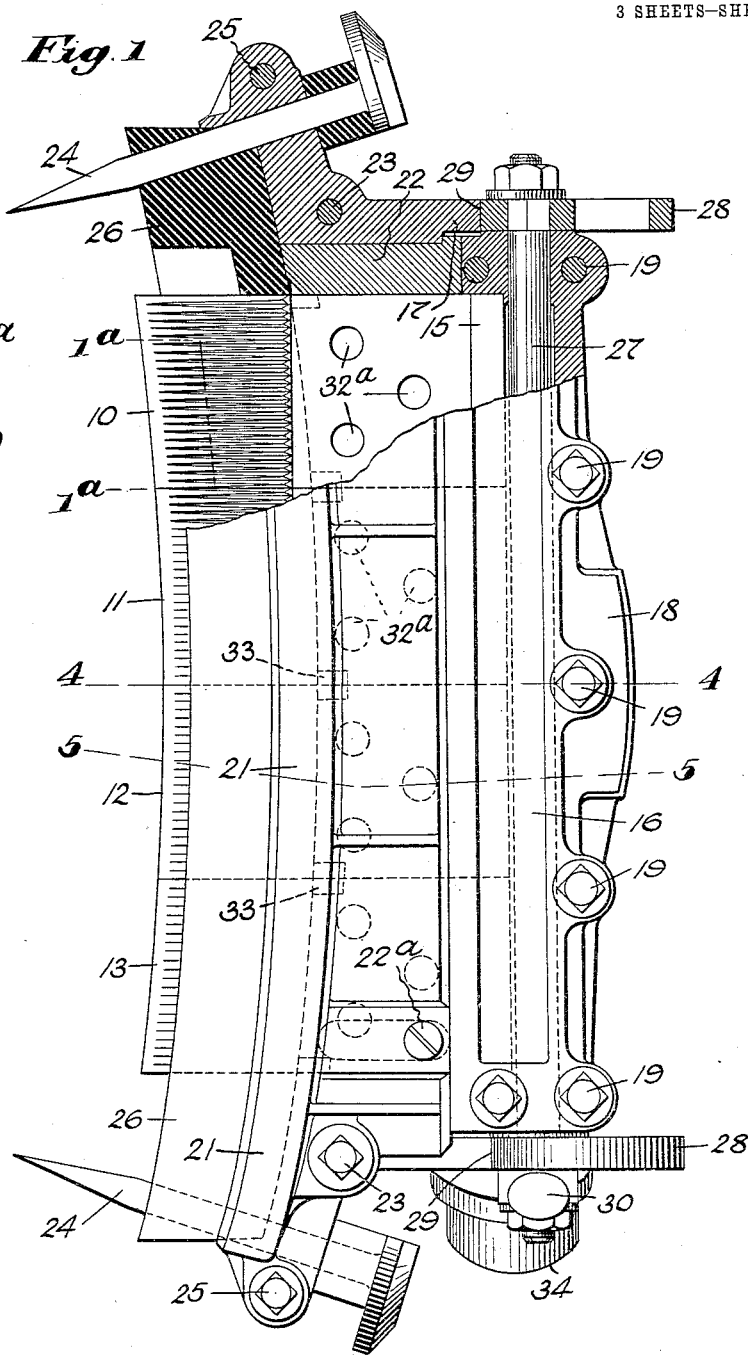
Witnesses:
Horace H. Crossman
Robert H. Kammler
Inventor:
Ernest W. Graves.
by Emery & Booth
Attys.

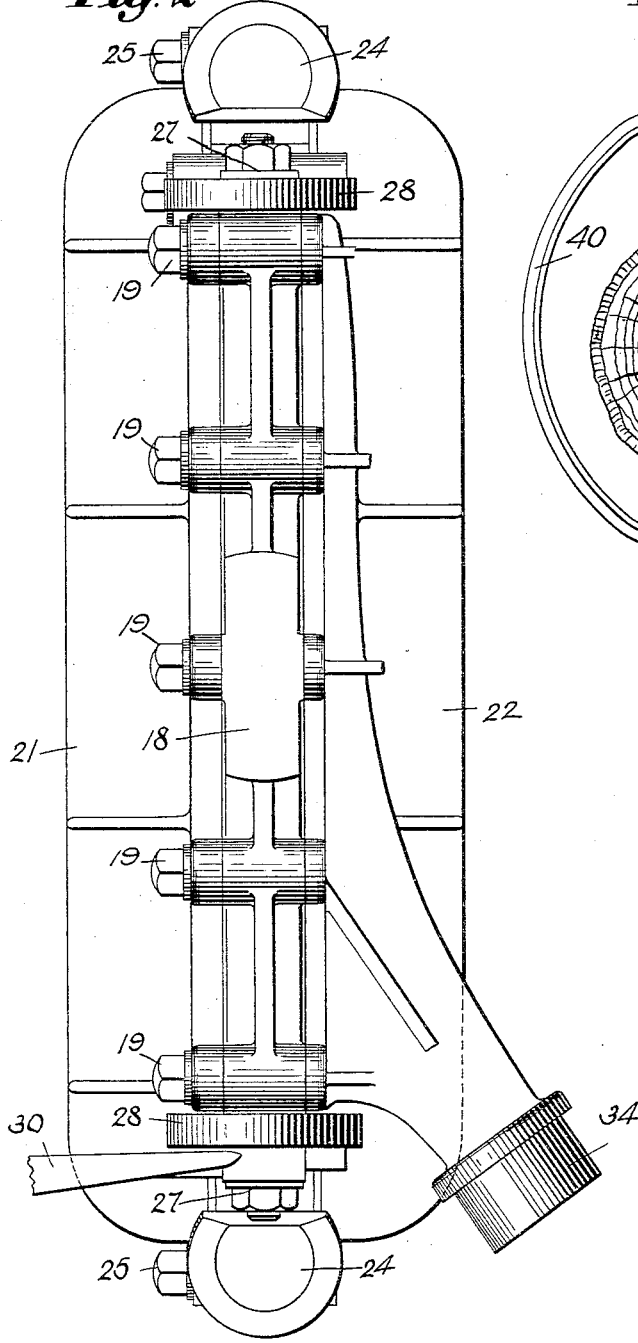
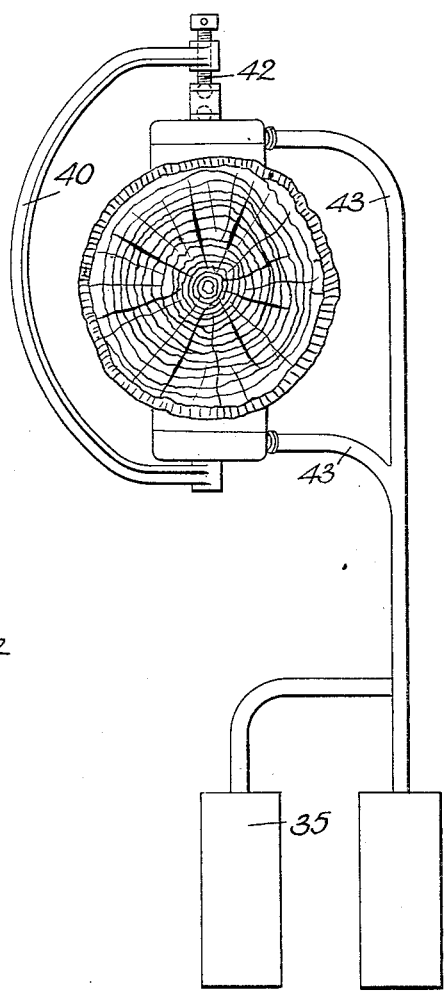

E. W. GRAVES.
APPARATUS FOR TAPPING RUBBER TREES.
APPLICATION FILED NOV. 1, 1907.
1,068,497.
Patented July 29, 1913.
3 SHEETS—SHEET 3.
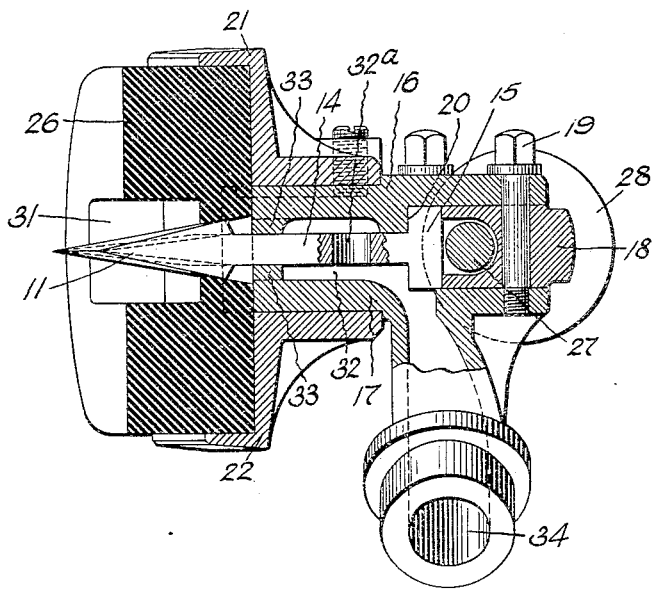
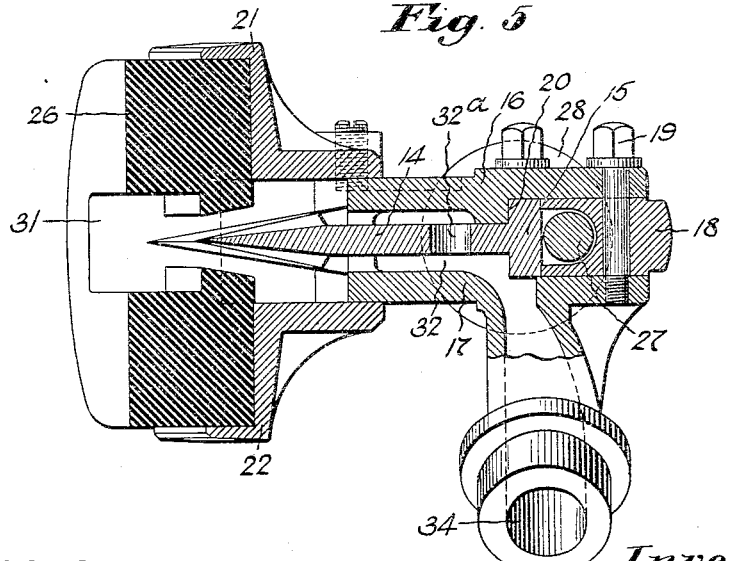
Witnesses:
Horace H. Crossman
Robert H. Kammler
Inventor:
Ernest W. Graves
by Emery & Booth
Attys

UNITED STATES PATENT OFFICE.

ERNEST W. GRAVES, OF BOSTON, MASSACHUSETTS, ASSIGNOR TO GRAVES AND GRAVES COMPANY, OF BOSTON, MASSACHUSETTS, A CORPORATION OF MASSACHUSETTS.

APPARATUS FOR TAPPING RUBBER-TREES.

1,068,497.  Specification of Letters Patent.  Patented July 29, 1913.

Application filed November 1, 1907. Serial No. 400,304.

*To all whom it may concern:*

Be it known that I, ERNEST W. GRAVES, a citizen of the United States, and a resident of Boston, in the county of Suffolk and State of Massachusetts, have invented an Improvement in Apparatus for Tapping Rubber-Trees, of which the following description, in connection with the accompanying drawings, is a specification, like letters on the drawings representing like parts.

This invention relates to the tapping of trees, vines, shrubs and the like, for the purpose of removing their juices or sap, and is more particularly applicable to the removal of milky juices, emulsions or latex of trees or the like which yield caoutchouc.

The caoutchouc or rubber latex is contained in cellular bark structures of various species of trees, shrubs and the like. Ordinarily, heretofore it has been customary to gouge out the bark so as to wound or incise the cells and provide a series of conduits into which the cells may bleed and along which the latex may flow to a convenient receptacle. These gouged out conduits have been formed ordinarily by actual removal of a part of the bark. Among other difficulties incurred in the methods heretofore used, it is found that the latex flows slowly; that coagulation soon takes place and obstructs the flow; and that the trees are considerably scarred.

Among other objects, this invention is designed to provide apparatus which may merely incise or puncture the cellular bark structure without gouging or removing any of it; which may promote the flow of the latex; and which may be capable of depleting the bark structure of its latex thoroughly and expeditiously.

A practicable form of apparatus embodying this invention is shown for purposes of illustration in the accompanying drawings, in which—

Figure 1 is a horizontal plan view showing the apparatus as it would be positioned on a tree at the right; Fig. 1ª is a detail section of the illustrative scarring means on a line 1ª—1ª of Fig. 1; Fig. 2 is a rear elevation as viewed from the right in Fig. 1; Fig. 3 is a diagrammatic representation of a plurality of tapping apparatuses with associated devices hereinafter explained; Fig. 4 is a transverse, vertical section on a line 4—4 of Fig. 1; Fig. 5 is a section similar to that of Fig. 4 on a line 5—5 of Fig. 1.

Referring now to the drawings, the specific, illustrative apparatus has scarring means shown as a knife (Fig. 1) conveniently consisting of four blades 10, 11, 12 and 13, the cutting edges of the blades being disposed in a curve adaptable to the curvature of the bark, either by placing the apparatus horizontal or by inclining it to the horizontal until it properly accommodates itself to the circumference of the tree.

The scarring means, illustrated by the knife blades referred to, is preferably formed to permit the escape of the latex while said means remains more or less in the wound of the bark, and to this end the knife blades 10, 11, 12 and 13 are grooved transversely to their cutting edge (see Fig. 1ª), so that the latex can escape over the blades through the grooves. As shown in Figs. 4 and 5, each blade has a shank 14 terminating in a head 15. The shanks 14 lie between mating plates 16 and 17, which are spaced apart at their outer ends by an interposed block 18, the plates and block being secured together by through-bolts 19. At its inner extremity the block 18 bears against the head 15 of the knife shanks and holds the latter against a continuous shoulder 20 of the plate 16, the plates 16 and 17 being thus held rigid with the knife. Embracing the outer faces of the plates 16 and 17 and in sliding contact therewith, are mating frame members 21 and 22. Said members 21, 22 (Fig. 1) extend lengthwise at their ends beyond the plates 16 and 17, and are there firmly secured together by through-bolts 23. The frame members have between them at their ends holding spikes 24, 24 adjustably clamped therebetween by clamping bolts 25, 25 and adapted to be driven or forced into a tree to hold the apparatus in position.

The frame members 21, 22 are appropriately shaped to receive a rubber gasket 26, which exemplifies means for making a substantially air tight contact with the bark surrounding the part which is scarred. When the apparatus is applied to a tree and the spikes 24, 24 driven firmly into place they hold the gasket snugly against the bark and also hold the frame members 21, 22 in position. The mating plates 16, 17 and the knife rigidly attached thereto are movable toward and from the tree in the slideways provided by the adjacent inner faces of the frame members 21, 22; this sliding movement being limited by screw pins 22ª mounted in the frame members 21 and 22 and extending through slots in the plates 16, 17 and the shanks of the blades. When the knife blades have been inserted in the bark they stand in substantially the position illustrated in Figs. 1 and 4, and when out of the tree they stand in a position shown in Fig. 5. The knife may be driven into the tree by hammer blows upon the block 18. As shown in Fig. 4, said block 18 has a concave seat which extends (Fig. 1) throughout the length of the block and receives a shaft 27. The extremities of the shaft are squared and fitted eccentrically in disks 28, 28. The latter bear against seats 29, 29 respectively which constitute part of the frame members 21, 22. A handle 30 is fixed to the shaft 27 for turning it. To drive the knife into the tree, the handle 30 is turned until the eccentrics 28 are spaced their maximum distance from their seats 29, 29. Thereupon hammer blows upon the block 18 will drive the knife into the tree to the desired distance. Thereafter, when the knife is to be withdrawn, the handle 30 is turned again, forcing the eccentrics 28, 28 against their seats 29, 29 and drawing the knife out.

In the face of the gasket 26 is provided a recess or chamber 31, through which the knife blades project. This chamber 31 communicates by the grooves on the knife blades, with a second chamber 32 between the mating plates 16, 17. As shown in Fig. 4, the plates 16 and 17 have integral lugs 33, 33 oppositely engaging the knife shanks 14; but these lugs extend only a short distance along the width of the blades, being located so as to overlap the edges of adjacent blades; and the space between adjacent lugs 33, 33 leaves free communication from the chamber 31 through the grooves on the blades to the chamber 32. The specific chamber 32 is divided into two parts by the shanks 14 of the blades but said shanks have ports 32ª permitting communication from one part of the chamber to the other. The plate 17 is formed to provide an outlet pipe 34, communicating with the chamber 32. At the outlet 34 air may be excluded from the chambers 31 and 32 by replacing it by some inactive medium; or a vacuum tank, or exhaust pump may be connected to the outlet 34 for the purposes already suggested. Preferably, the outlet 34 is connected either directly or indirectly by a flexible hose or the like with some means for exhausting or rarefying the air in the chambers. If desired, a number of tapping devices such as has been described may have their outlets connected in series or in multiple with a vacuum tank 35, an exhaust pump or the like, as shown in Fig. 3.

In using the above described specific apparatus, it may be applied to a tree when the knife stands in the retired position shown in Fig. 5. The face of the rubber gasket 26 is placed against the selected place on the tree and the spikes 24, 24 driven firmly into place. The knife blades are then driven into the bark to make the incision, thereby not only incising the cells but also opening communication by its serrations from the cells to the chamber 31 and from the latter to the chamber 32 and through the outlet 34. With this arrangement the latex will flow out through the chambers to the outlet. If the air in the chambers is excluded or is rarefied, coagulation will be arrested or retarded and the flow will continue much longer than when air is present. The exhaustion of the air may also by suction draw the latex out, and in so doing it will remove latex from a greater distance than it would flow by gravity or capillary attraction. For this latter reason, a plurality of tapping apparatuses embodying this invention will exhaust the latex of a tree when placed farther apart than it was practicable to make the transverse ditches hereinbefore described; and, as a result, fewer scars are necessary to be made in order to deplete the tree.

A convenient means for employing two or more tapping devices is shown in Fig. 3. Two of the devices are there shown as positioned upon opposite sides of a tree and engaged between the arms of a yoke 40. At one end the yoke has a screw-press 42, which upon being turned forces both of the tapping devices to scar the tree. For convenience, each tapping device may be connected by a ball and socket joint with the yoke arms, in order to permit ready adjustment. The outlets of the tapping devices are connected with connected tubes or pipes 43, 43 which convey the latex or other juice to a suitable receptacle. If the tapping devices are to have the air exhausted therefrom they may be appropriately connected with a vacuum tank 35 or the like.

Many advantages may accrue from the use of an embodiment of the invention such as has been described. By reason of the preferred rarefication or exclusion of air, a single scarring will suffice to permit the removal of all the latex which can be reached therefrom, the additional re-scarring heretofore necessitated by coagulation being eliminated and the flow greatly expedited. The use of suction increases the rapidity of the flow and extends the distance from which the latex can be drawn through intervening cells, this being true since the pneumatic action forces the latex sufficiently to overcome resistance to seepage or flow at points where gravity or capillary attraction alone would be insufficient. While it is preferred, in practicing this invention to make mere incisions instead of gouged out channels, it is entirely practicable to employ certain features of the invention (as, for example, the air exclusion) in connection with the described channels or any other suitable form of scarification or wounding.

This invention contributes to the art many advantages other than those particularly pointed out, which will be apparent to those familiar with the tapping of rubber yielding trees and the like.

It is to be understood that the invention is not essentially limited to the details of construction and operation hereinbefore set forth. For example, it is by no means indispensable that the knife have a continuous cutting edge, since any instrument capable of making a practicable incision or puncture would serve a like purpose, if properly applied. Moreover, it is not necessary that all of the features of this invention be used conjointly, since they are capable of use separately to advantage.

Claims.

1. In a tree tapping apparatus, a scarring device comprising a knife having means projecting from a face thereof to permit latex to escape from the tree outside said device while the latter remains in the scar.

2. A scarring device to be used in tapping trees comprising a knife having projections thereon forming a surface channel to extend beyond the surface of the tree to permit latex to flow past said device while the latter remains inserted in the tree.

3. A scarring device to be used in tapping trees having a wedge shaped scarring knife arranged to make an incision and to spread the walls of the incision, and having a plurality of projections thereon forming surface channels to extend beyond the surface of the tree to permit latex to flow past the edge of said knife while the latter remains inserted in the tree.

4. A scarring device to be used in tapping trees having an elongated sectional scarring edge curved to be adjusted to the curved conformation of the tree surface.

5. A scarring device to be used in tapping trees having a scarring edge comprising a plurality of alined blades connected to be inserted simultaneously.

6. A scarring device to be used in tapping trees having a plurality of alined blades presenting a substantially continuous curved edge; and means connecting said blades permitting them to be inserted simultaneously.

7. A scarring device constructed to conduct latex from trees and provided with means for withdrawing said device after it has been inserted in a tree.

8. A scarring device constructed to conduct latex from trees and provided with power-multiplying means to withdraw the same when it has been inserted in a tree.

9. A scarring device constructed to conduct latex from trees and provided with means to react on the tree for withdrawing said device when it has been inserted in the tree.

10. Tree tapping apparatus comprising, in combination, a chambered member closed when applied to the surface of the tree; means in said chamber to scar the tree; and provision for conducting latex from said chamber to an outlet.

11. Tree tapping apparatus comprising, in combination, a chambered member to make closure with the surface of a tree; scarring means in said chamber; and means to remove air from said chamber.

12. Tree tapping apparatus comprising, in combination, a chambered member having a yielding face to make closure with the surface of a tree; scarring means in said chamber; and means to rarefy the air in said chamber.

13. Tree tapping apparatus comprising, in combination, means completely to inclose a scar on a tree and to make substantially air tight closure with the surface of the tree surrounding the scar; means to hold the scar open while permitting latex to flow therefrom; and means to remove air from the scar.

14. Tree tapping apparatus constructed to conduct latex from trees and comprising, in combination, scarring means; and a support therefor to be mounted on a tree, the scarring means being movable to permit insertion and withdrawal thereof.

15. Tree tapping apparatus constructed to conduct latex from trees and comprising, in combination, scarring means; and a support therefor to be mounted on the tree to hold said means in position preparatory to insertion in the tree.

In testimony whereof, I have signed my name to this specification, in the presence of two subscribing witnesses.

ERNEST W. GRAVES.

Witnesses:
F. IRENE CHANDLER,
LAURENCE A. JANNEY.

Copies of this patent may be obtained for five cents each, by addressing the "Commissioner of Patents, Washington, D. C."